(12) United States Patent
Guthrie et al.

(10) Patent No.: US 7,069,636 B2
(45) Date of Patent: Jul. 4, 2006

(54) FRICTION FACING METHOD FOR USE IN A FRICTION ENVIRONMENT

(75) Inventors: Douglas B Guthrie, Dayton, OH (US); Terry E Nels, Xenia, OH (US); Jonathan M Rich, Beavercreek, OH (US); Eric A Schueler, Maineville, OH (US)

(73) Assignee: Euroflamm Select Inc., Dayton, OH (US)

( * ) Notice: Subject to any disclaimer, the term of this patent is extended or adjusted under 35 U.S.C. 154(b) by 99 days.

(21) Appl. No.: 10/677,577

(22) Filed: Oct. 2, 2003

(65) Prior Publication Data

US 2005/0071979 A1    Apr. 7, 2005

(51) Int. Cl.
*B23P 25/00* (2006.01)

(52) U.S. Cl. .......................... 29/458; 29/557; 29/558; 192/107 R; 192/113.36

(58) Field of Classification Search ................. 29/458, 29/557, 558; 192/107 R, 113.36
See application file for complete search history.

(56) References Cited

U.S. PATENT DOCUMENTS

| | | | |
|---|---|---|---|
| 2,690,248 A | 9/1954 | McDowall | |
| 2,850,118 A | 9/1958 | Byers | |
| 3,042,168 A | 7/1962 | Binder | |
| 3,094,194 A | 6/1963 | Kershner | |
| 3,198,295 A | 8/1965 | Fangman et al. | |
| 3,250,349 A | 5/1966 | Bymes et al. | |
| 3,412,836 A | 11/1968 | Wilmer | |
| 3,491,865 A | 1/1970 | Stockton | |
| 3,534,842 A | 10/1970 | Davison, Jr. | |
| 3,871,934 A | 3/1975 | Marin | |
| 3,885,659 A | 5/1975 | Smith | |
| 3,927,241 A | 12/1975 | Augustin | |
| 3,937,303 A | 2/1976 | Allen et al. | |
| 4,027,758 A | 6/1977 | Gustavsson et al. | |
| 4,139,085 A * | 2/1979 | Kanbe et al. | 192/107 R |
| 4,260,047 A | 4/1981 | Nels | |
| 4,267,912 A | 5/1981 | Bauer et al. | |
| 4,287,978 A * | 9/1981 | Staub, Jr. | 192/113.36 |
| 4,291,794 A | 9/1981 | Bauer | |
| 4,396,100 A | 8/1983 | Eltze | |
| 4,445,602 A | 5/1984 | Channa | |
| 4,449,621 A | 5/1984 | F'Geppert | |
| 4,674,616 A | 6/1987 | Mannino, Jr. | |
| 4,726,455 A | 2/1988 | East | |

(Continued)

OTHER PUBLICATIONS

Select Powertrain Technologies. Design Review of Daimler Chrysler TCC Carbon Friction Facing. Nov. 19, 2001.

(Continued)

*Primary Examiner*—Essama Omgba
(74) *Attorney, Agent, or Firm*—Jacox Meckstroth & Jenkins

(57) ABSTRACT

A facing material for a power transmission-absorption assembly is shown and described. In one embodiment, the facing material includes a plurality of first channels having a first, deep depth and a plurality of second channels having a second, shallow depth. One or more of the plurality of second channels may be superimposed or in fluid communication with the first channels to enable fluid to flow across the surface 12c and through the first channel to achieve the desired fluid flow characteristics. The second channels may be defined by a connector that has varying shapes to further facilitate the desired fluid flow characteristics. The material may be used in a power transmission-absorption environment such as on a blocker synchronizer ring, clutch plate or the like.

22 Claims, 10 Drawing Sheets

U.S. PATENT DOCUMENTS

| | | |
|---|---|---|
| 4,770,283 A | 9/1988 | Putz et al. |
| 4,878,282 A | 11/1989 | Bauer |
| 4,913,267 A | 4/1990 | Campbell et al. |
| 4,917,743 A | 4/1990 | Gramberger et al. |
| 4,995,500 A | 2/1991 | Payvar |
| 5,038,628 A | 8/1991 | Kayama |
| 5,076,882 A | 12/1991 | Oyanagi et al. |
| 5,094,331 A | 3/1992 | Fujimoto et al. |
| 5,101,953 A | 4/1992 | Payvar |
| 5,134,005 A | 7/1992 | Wada et al. |
| 5,143,192 A | 9/1992 | Vojacek et al. |
| 5,176,236 A | 1/1993 | Ghidorzi et al. |
| 5,207,305 A | 5/1993 | Iverson |
| 5,332,075 A | 7/1994 | Quigley et al. |
| 5,335,765 A | 8/1994 | Takakura et al. |
| 5,439,087 A | 8/1995 | Umezawa |
| 5,454,454 A | 10/1995 | Easton et al. |
| 5,460,255 A | 10/1995 | Quigley |
| 5,495,927 A | 3/1996 | Samie et al. |
| 5,551,549 A | 9/1996 | Cooke et al. |
| 5,566,802 A | 10/1996 | Kirkwood |
| 5,585,166 A | 12/1996 | Kearsey |
| 5,615,758 A | 4/1997 | Nels |
| 5,660,259 A | 8/1997 | Peng et al. |
| 5,669,474 A | 9/1997 | Dehrmann et al. |
| 5,671,835 A | 9/1997 | Tanaka et al. |
| 5,682,971 A | 11/1997 | Takakura et al. |
| 5,776,288 A | 7/1998 | Stefanutti et al. |
| 5,799,763 A | 9/1998 | Dehrmann |
| 5,819,888 A | 10/1998 | Tamura et al. |
| 5,842,551 A | 12/1998 | Nels |
| 5,858,511 A | 1/1999 | Lisowsky |
| 5,878,860 A | 3/1999 | Pavangat et al. |
| 5,897,797 A | 4/1999 | Drouillard et al. |
| 5,921,366 A | 7/1999 | Walth et al. |
| 5,934,435 A | 8/1999 | Bauer |
| 5,954,172 A | 9/1999 | Mori |
| 5,975,260 A | 11/1999 | Fischer et al. |
| 5,998,311 A | 12/1999 | Nels |
| 6,019,205 A | 2/2000 | Willwerth et al. |
| 6,035,991 A | 3/2000 | Willwerth et al. |
| 6,035,992 A * | 3/2000 | Menard et al. ........ 192/107 M |
| 6,036,903 A | 3/2000 | Kierbel et al. |
| 6,047,806 A | 4/2000 | Sasse |
| 6,062,367 A | 5/2000 | Hirayanagi et al. |
| 6,065,579 A | 5/2000 | Nels |
| 6,135,256 A | 10/2000 | Han et al. |
| 6,145,645 A | 11/2000 | Kroll et al. |
| 6,170,629 B1 | 1/2001 | Suzuki et al. |
| 6,203,649 B1 | 3/2001 | Kremsmair et al. |
| 6,213,273 B1 | 4/2001 | Menard et al. |
| 6,247,568 B1 | 6/2001 | Takashima et al. |
| 6,273,228 B1 | 8/2001 | Otto et al. |
| 6,290,046 B1 | 9/2001 | Menard et al. |
| 6,293,382 B1 | 9/2001 | Nishide et al. |
| 6,345,711 B1 | 2/2002 | Sullivan |
| 6,370,755 B1 | 4/2002 | Wakamori |
| 6,397,997 B1 | 6/2002 | Kato |
| 6,409,006 B1 | 6/2002 | Wakamori et al. |
| 6,439,363 B1 | 8/2002 | Nels |
| 6,454,072 B1 | 9/2002 | Merkel et al. |
| 6,497,312 B1 | 12/2002 | Sasse et al. |
| 6,499,579 B1 | 12/2002 | Ono et al. |
| 6,557,685 B1 | 5/2003 | Hattori |
| 6,581,740 B1 | 6/2003 | Szalony |
| 6,601,684 B1 | 8/2003 | Collis et al. |
| 2001/0042668 A1 * | 11/2001 | Ono et al. ............. 192/113.36 |

OTHER PUBLICATIONS

Select Powertrain Technologies Corp. Tremec—Select Open Issue. Feb. 2, 2002.

* cited by examiner

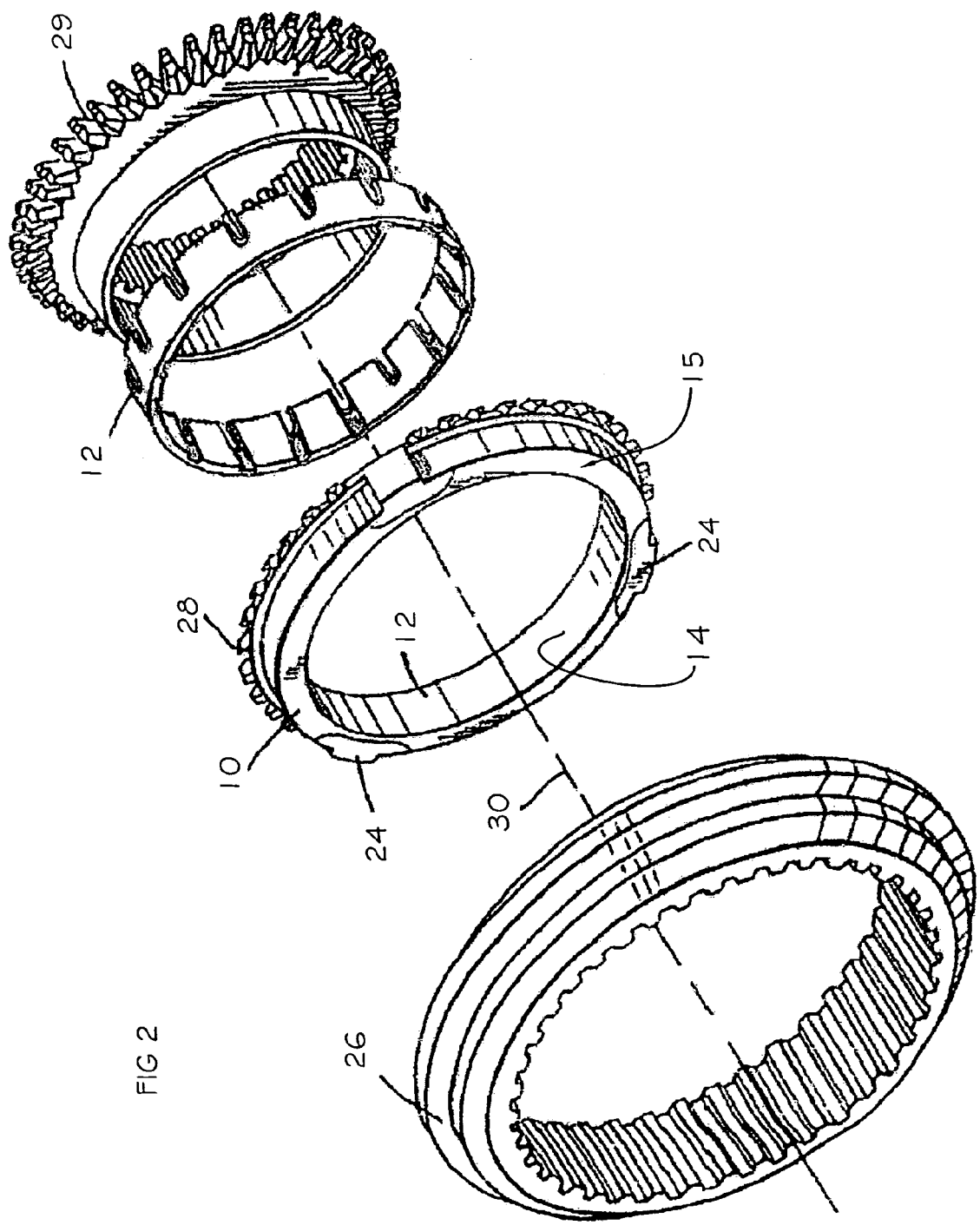

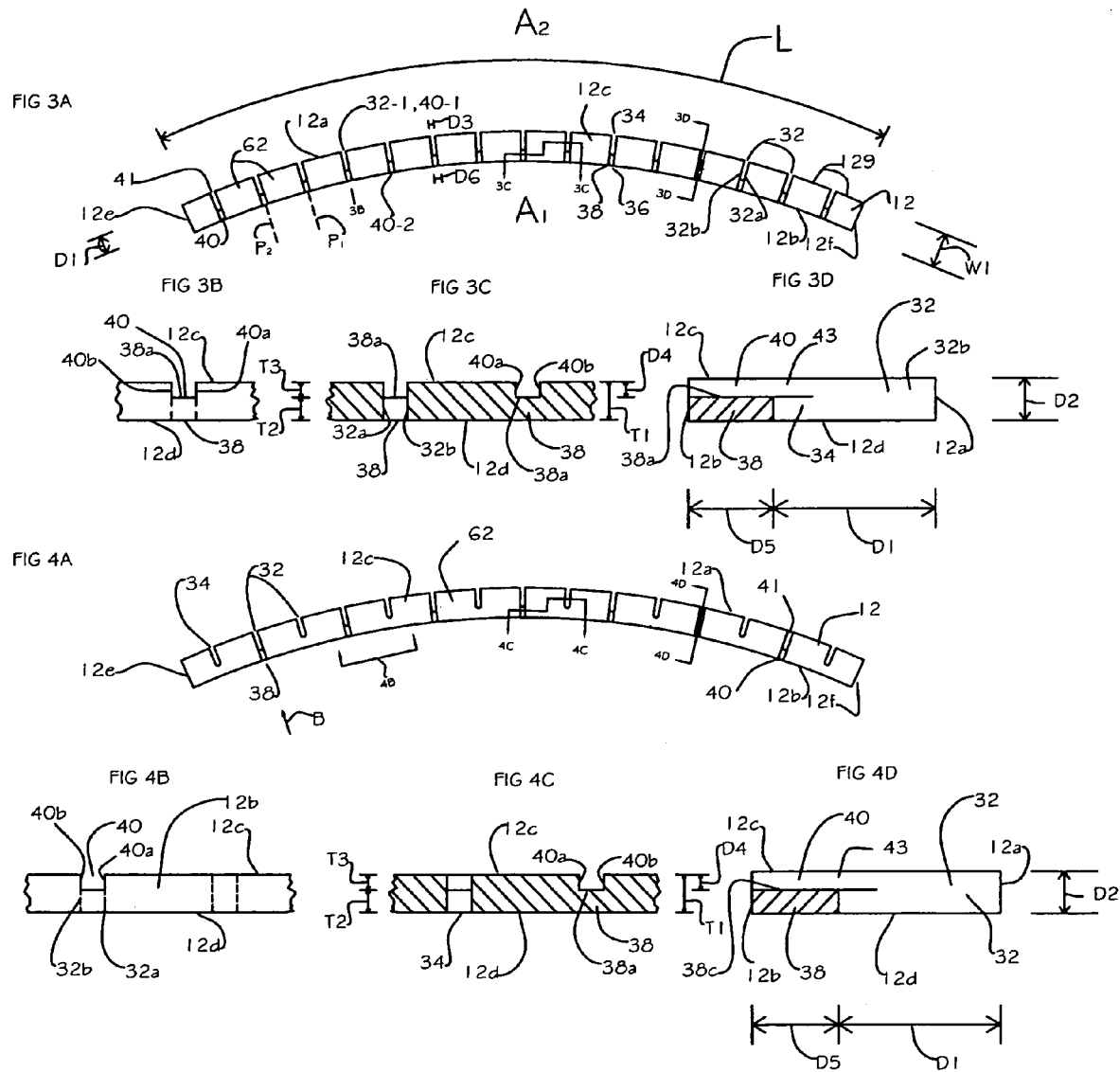

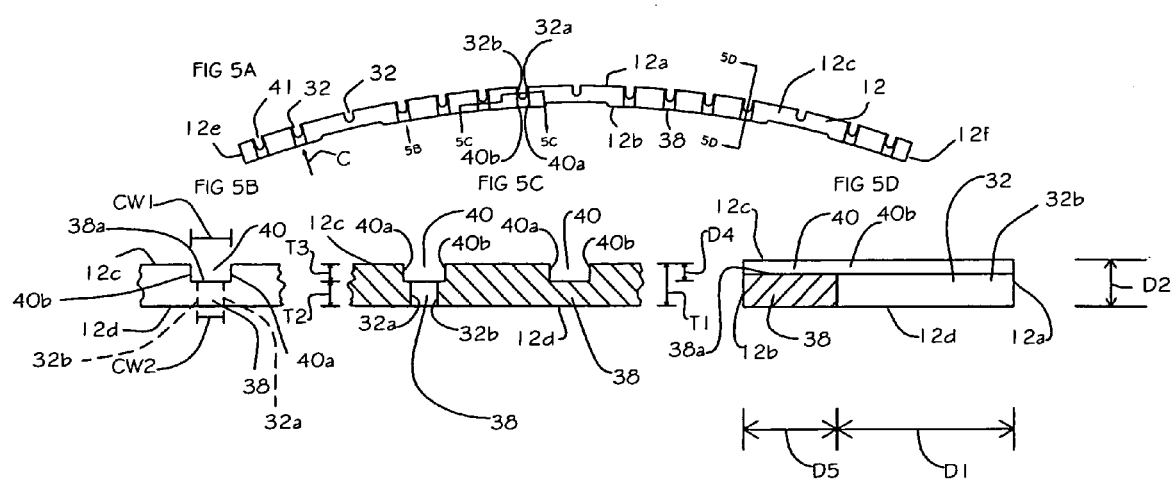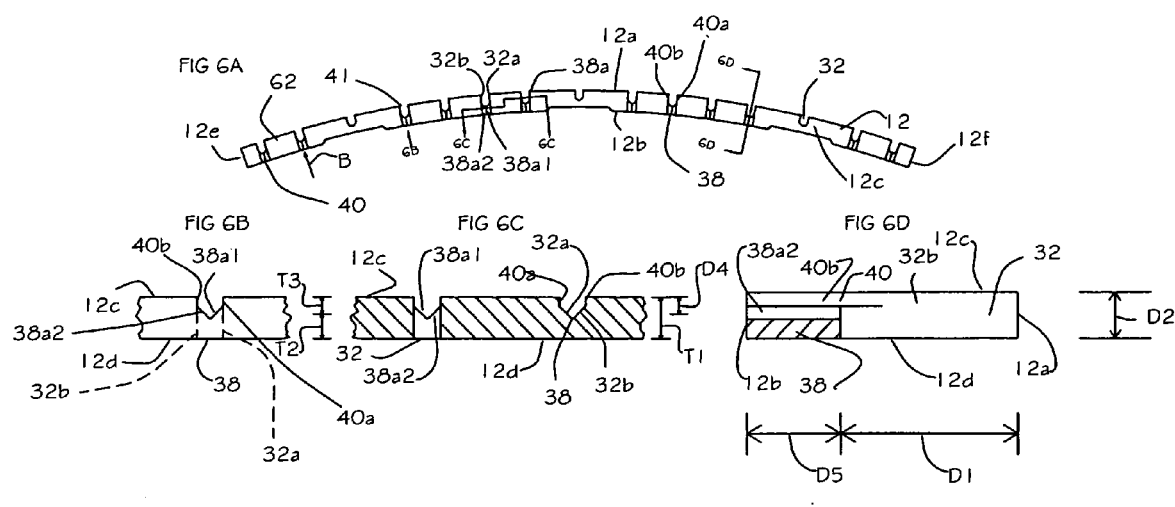

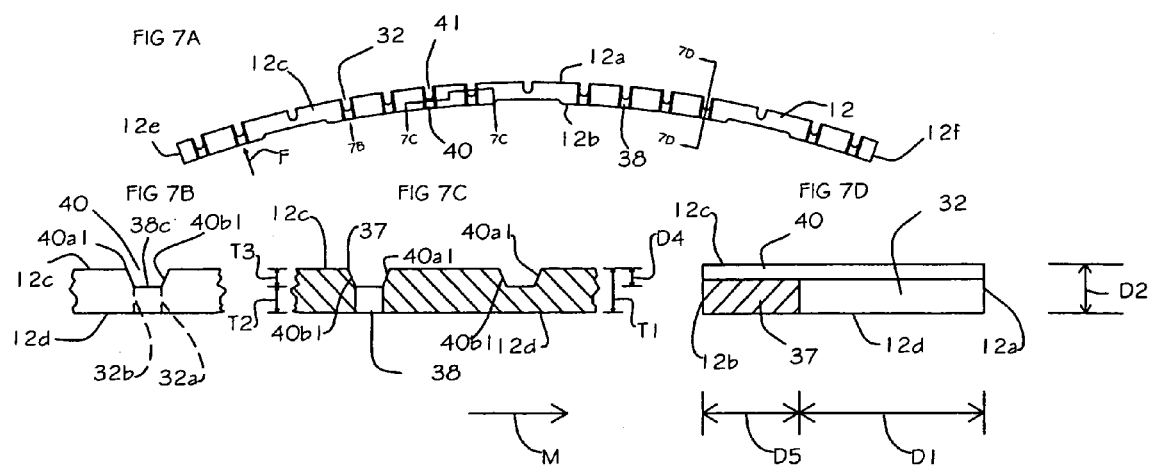
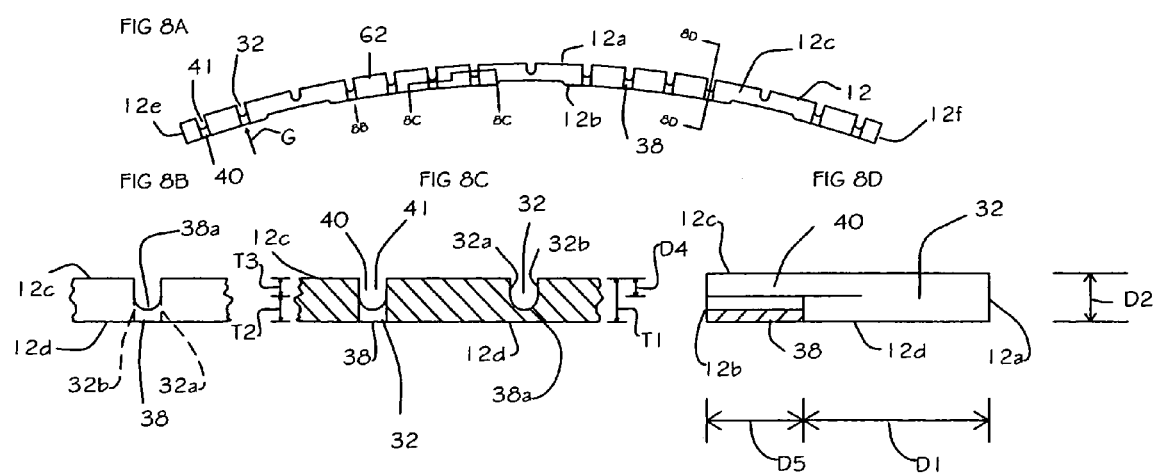

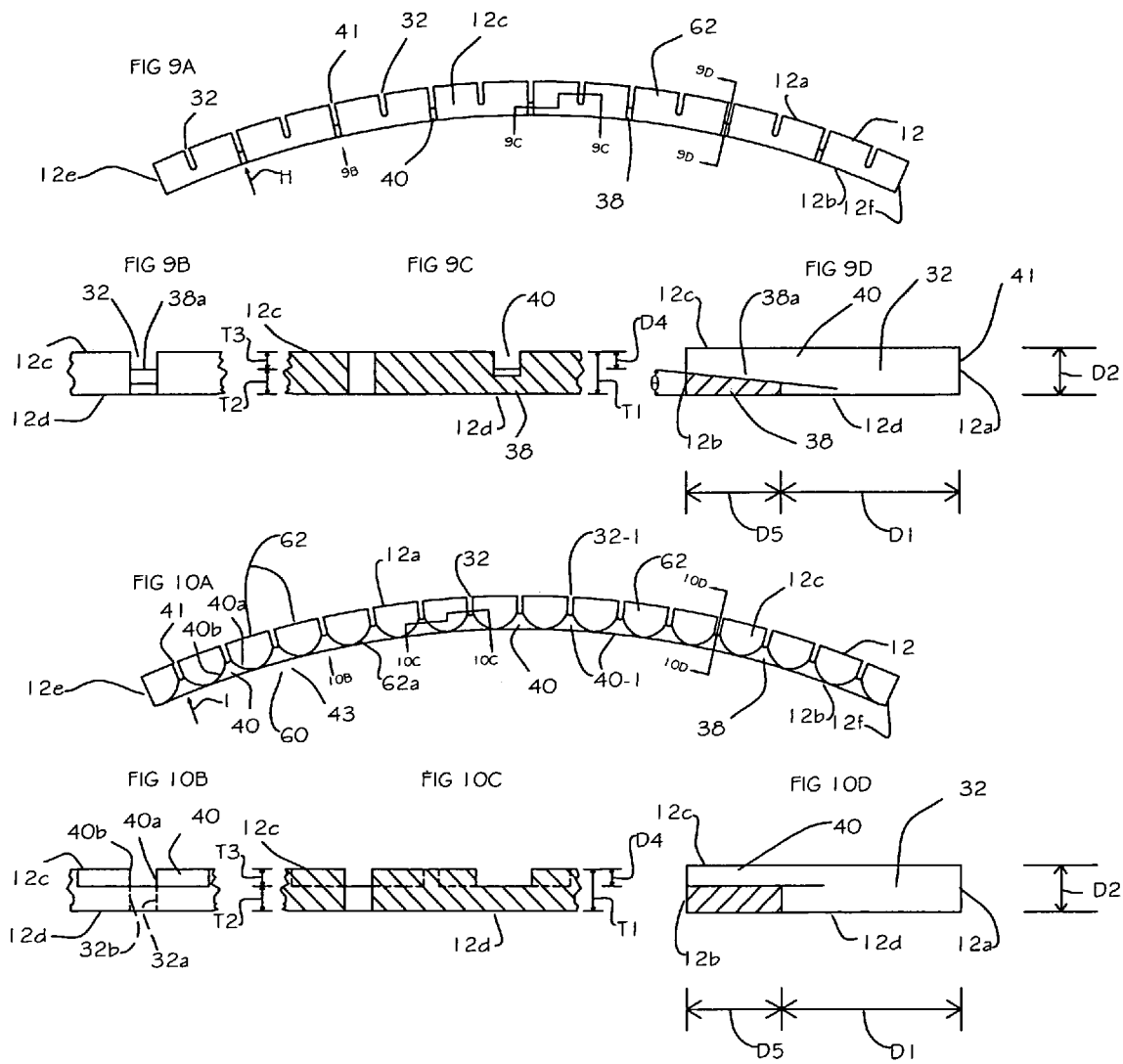

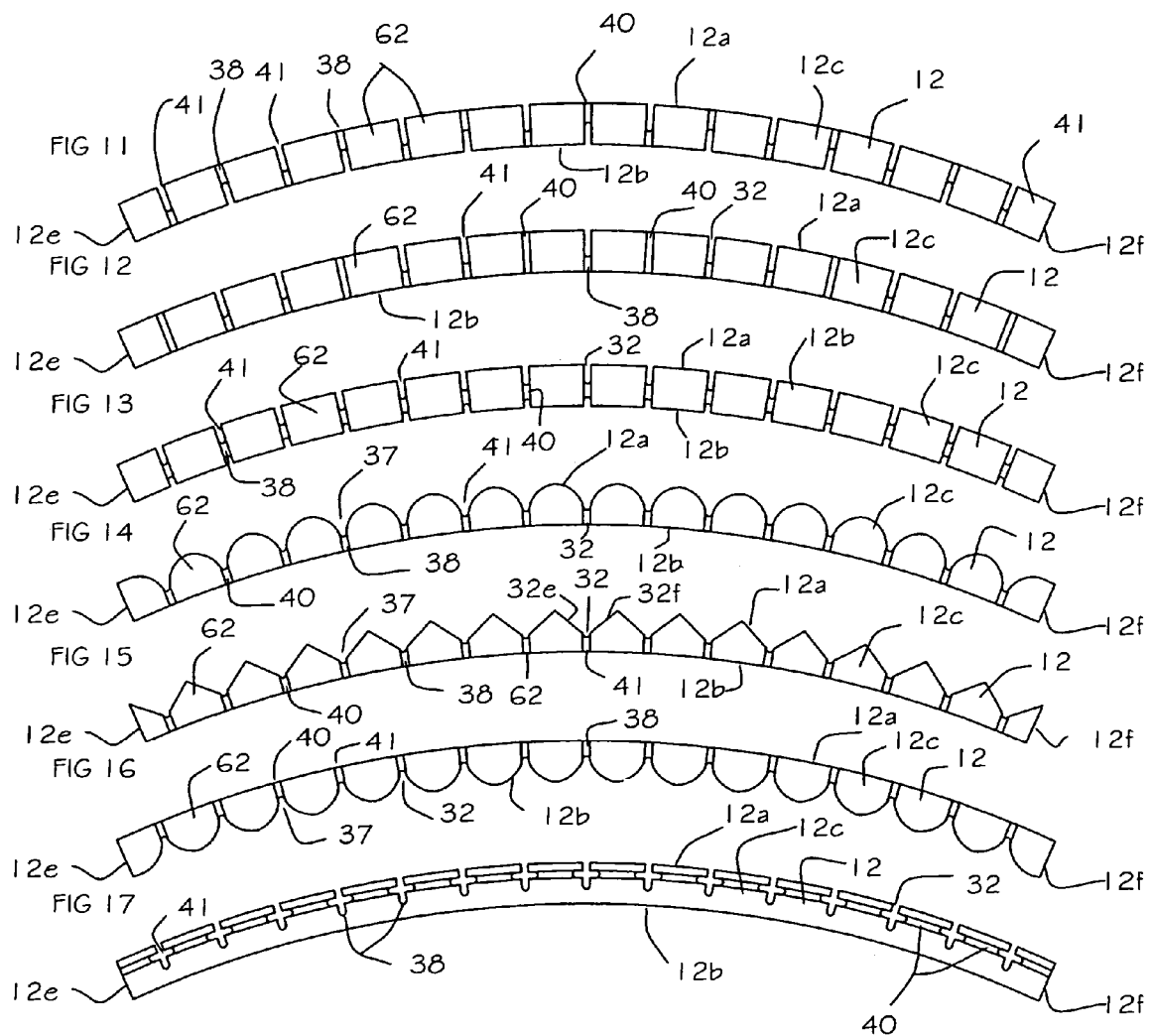

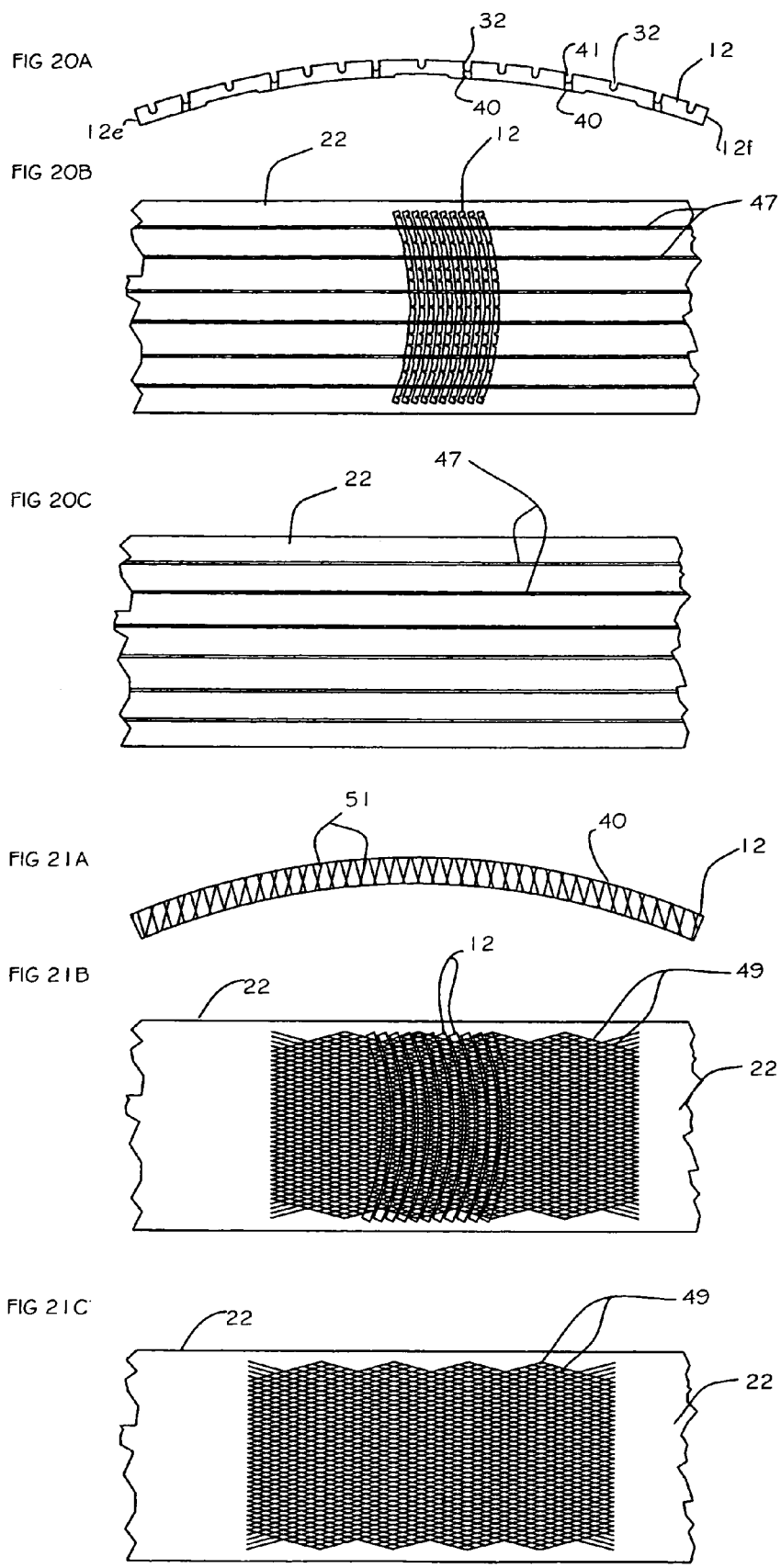

FRICTION FACING METHOD FOR USE IN A FRICTION ENVIRONMENT

BACKGROUND OF THE INVENTION

1. Field of the Invention

This invention relates to a friction material and method for controlling fluid flow, and, more particularly, to a facing material having a plurality of channels of varying dimensions as described herein.

2. Description of Prior Art

In clutches, brakes, manual or automatic transmissions, limited slip differentials, hoists and similar friction power transmissions and energy absorption devices, there is generally provided one or more sets of cooperating members in which one of the cooperating members drives the other. It is not uncommon for these cooperating members to move in a cooling medium or liquid, which is generally some type of lubricating oil, and frequently the oil is forced to circulate about and between the engaging surfaces of the cooperating member so as to continuously lubricate and cool them. In order to accomplish circulation of the cooling medium within blocker rings, clutch plates, transmission bands and the like, the prior art has provided grooves or slots directly in the engaging surfaces of one or both of the cooperating members or in friction materials fixed thereto. For example, various materials and devices may have a brass coating or a paper lining as seen in U.S. Pat. Nos. 4,267,912; 4,878,282; 4,260,047; 6,065,579; and 5,615,758, all of which are incorporated herein by reference and made a part hereof.

In the past, forming grooves within the friction materials of cooperating members typically added complexity to the manufacturing of such friction material and the power transmission-absorption device.

In order to facilitate or eliminate the hydrodynamic friction stemming from oil or cooling medium lying on the surface of the friction material engaging the driving member, an improved friction material for circulating the cooling medium is preferred.

Prior art friction materials also include certain pyrolytic carbon friction materials as seen in U.S. Pat. No. 4,700,823 to Winkler and U.S. Pat. No. 4,291,794 to Bower. In such friction material, a meshed cloth substrate formed of carbon fibers is provided with a coating of carbon or other material being deposited on the fibers by chemical vapor deposition. This type of friction material has a characteristic of a relatively open mesh, which allows ready penetration by an adhesive for improving bonding as well as a certain degree of veracity therethrough. However, as pointed out in U.S. Pat. No. 4,291,794, grooving material of such material is still provided in order to permit the flow of the cooling fluid between the friction faces of the cooperating members of the power transmission or energy absorption assembly. This type of friction material also does not easily provide highly bonded fibers as friction surface of the material nor does it achieve a highly controlled texture as needed when it is desired to control fluid flow. Moreover, it has been found that such friction material is difficult to compress to a desired thickness, such as during the process of bonding it to a member.

U.S. Pat. No. 4,878,282 illustrates a method for producing friction plate, synchronizer blocking rings and similar structures which use friction lining material applied as a continuous member on a support where the ends of the grooves are open by removal of the friction lining material which close the grooves. This requires several manufacturing steps, including cutting the material, assembling the material to the support, densifying the material once it was on the support and the trimming of a portion of the material. Unfortunately, the use of this type of process created, for example, about 20% scrap material.

U.S. Pat. No. 6,065,579 provided an improved system and method over the prior art. In that reference, a material for an element of a power transmission-absorption assembly and the method of making such material is disclosed. The material had a pre-selected channel configuration to discourage the formation of hydrodynamic oil films that create poor cold shift characteristics and to create a path for trapped oil at the friction interface. Another embodiment of that invention disclosed a material and method for slotting the material and situating the material on a blocker ring to facilitate providing a plurality of space grooves having an open end which was substantially larger than the closed end. The material optionally included a raised rib or chamfer which facilitated controlling the fluid at an area of engagement between the material and a mating friction member. FIGS. 18–21c of the reference illustrate a friction material referred to in the reference, showing a plurality of slots.

What is needed, therefore, is an improvement over the prior art which provides means, material and process which further facilitates providing a desired amount of fluid flow across the friction-facing environment and which, for example, further facilitates controlling, increasing and/or decreasing fluid flow across a surface of the facing material.

SUMMARY OF THE INVENTION

One object of the invention is to facilitate increasing and controlling fluid flow across a facing material on a part, such as a blocker ring, clutch plate or the like. Another object of the invention is to provide a plurality of channels having varying dimensions, such as depth, to achieve desired fluid flow characteristics.

In one aspect, the invention comprises a friction material facing comprising a material facing having a first edge, a second edge, a first surface and a second surface; a plurality of spaced first channels extending from the first edge toward the second edge a predetermined distance; at least one of the plurality of spaced first channels extending between the first surface and the second surface through the material facing a first predetermined depth; and the material facing further comprising a second channel defining a predetermined second channel area extending between the first surface and the second surface a second predetermined depth, the second channel enabling fluid communication between a first area associated with a first side with a second area associated with a second side.

In another aspect or embodiment, the invention comprises a friction material for use on a friction material support, the friction material comprising a first edge associated with a first area; a second edge associated with a second area; a friction surface for engaging a friction component; an adhesive surface for adhering said friction material onto the friction material support; a plurality of spaced apertures having an opening associated with the first edge, at least a portion of each of the plurality of spaced apertures defining a first channel in the friction material for receiving fluid; and at least one second channel also capable of receiving fluid and at least one second channel having a second channel depth that is less than a thickness of said material.

In another aspect or embodiment, the invention comprises a friction material facing comprising a friction material; a plurality of first channels in the friction material; and a plurality of second channels in the friction material, the plurality of second channels and the plurality of first channels being capable of receiving a fluid.

In yet another embodiment or aspect of the invention, the invention comprises a friction member for use in a transmission assembly, the friction member comprising a metal support ring; a friction material; an adhesive for securing said friction material onto said metal support ring; the friction material comprising a first edge associated with a first area; a second edge associated with a second area; a friction surface for engaging a friction component; and an adhesive surface for adhering the friction material onto the friction material support; a plurality of spaced apertures defining an open first channel in the friction material for receiving fluid; and at least one second channel also capable of receiving fluid, and at least one second channel having a second channel depth that is less than a thickness of the material.

In another aspect of the invention, the invention or embodiment comprises A method for forming a friction member comprising the steps of providing a friction facing comprising a plurality of apertures having an open end and a closed end; situating the friction facing onto a support member; and creating a plurality of second channels into the friction facing.

In still another aspect, this invention comprises a method of increasing fluid flow across a facing material comprising the steps of providing a plurality of channels comprising a shallow area and a deep area for permitting fluid to flow from a first area, across a surface of the facing material, to a second area.

In yet another aspect, this invention comprises a facing material for increasing fluid flow across a surface of said facing material comprising a plurality of channels comprising a shallow area and a deep area for permitting fluid to flow from a first area, across a surface of the facing material, to a second area.

Another object is to form and provide friction material in a supply having pre-grooved channels 50.

Other objects and advantages of the invention will be apparent from the following description, the accompanying drawings and the appended claims.

BRIEF DESCRIPTION OF ACCOMPANYING DRAWING

FIG. 2 is an exploded view of a blocker ring depicted in FIGS. 1A and 1B with its cooperating elements in a typical power transmission-absorption assembly;

FIGS. 3A–3D are various views of a friction material with an embodiment of the invention showing a plurality of grooves or channels formed by a deep channel and a shallow channel;

FIGS. 4A–4D illustrate another embodiment of the invention;

FIGS. 5A–5D illustrates another embodiment of the invention;

FIGS. 6A–6D illustrate yet another embodiment of the invention;

FIGS. 7A–7D illustrate still another embodiment of the invention;

FIGS. 8A–8D illustrate another embodiment of the invention, illustrating a non-planer connection portion;

FIGS. 9A–9D illustrate another embodiment of the invention;

FIGS. 10A–10D illustrate another embodiment of the invention showing a funnel-shaped opening associated with a second channel;

FIG. 11 illustrates another embodiment of the invention, illustrating the connector portion altering from being positioned in a staggered or altering arrangement in association with either a first side or a second side of the facing material;

FIG. 12 is another illustration of the invention showing second channels alone and a facing material having a plurality of channels having a deep and shallow channel configuration;

FIG. 13 is an illustration of a connector situated between the first side and the second side;

FIG. 14 is an illustration of another embodiment showing a funnel-shaped opening associated with the second or deep channel;

FIG. 15 is another illustration of an open channel defined by generally linear or planer walls;

FIG. 16 is a view illustrating the connectors associated with the first side and a funnel-shaped opening associated with the first channel associated with the second channel;

FIG. 17 is an illustration showing a channel that connects a plurality of first or deep channels;

FIGS. 20A–20C illustrate another feature of the invention wherein the plurality of second channels are preformed or premachined into the supply material which is then used to stamp the facings to provide a facing having a plurality of first and second channels that are in fluid communication; and FIGS. 21A–21C illustrate a stamping from a supply roll having a plurality of preformed or premachined second channels that when stamped provide a facing having a desired pattern of second channels.

DETAILED DESCRIPTION OF PREFERRED EMBODIMENT

Figure 1A:
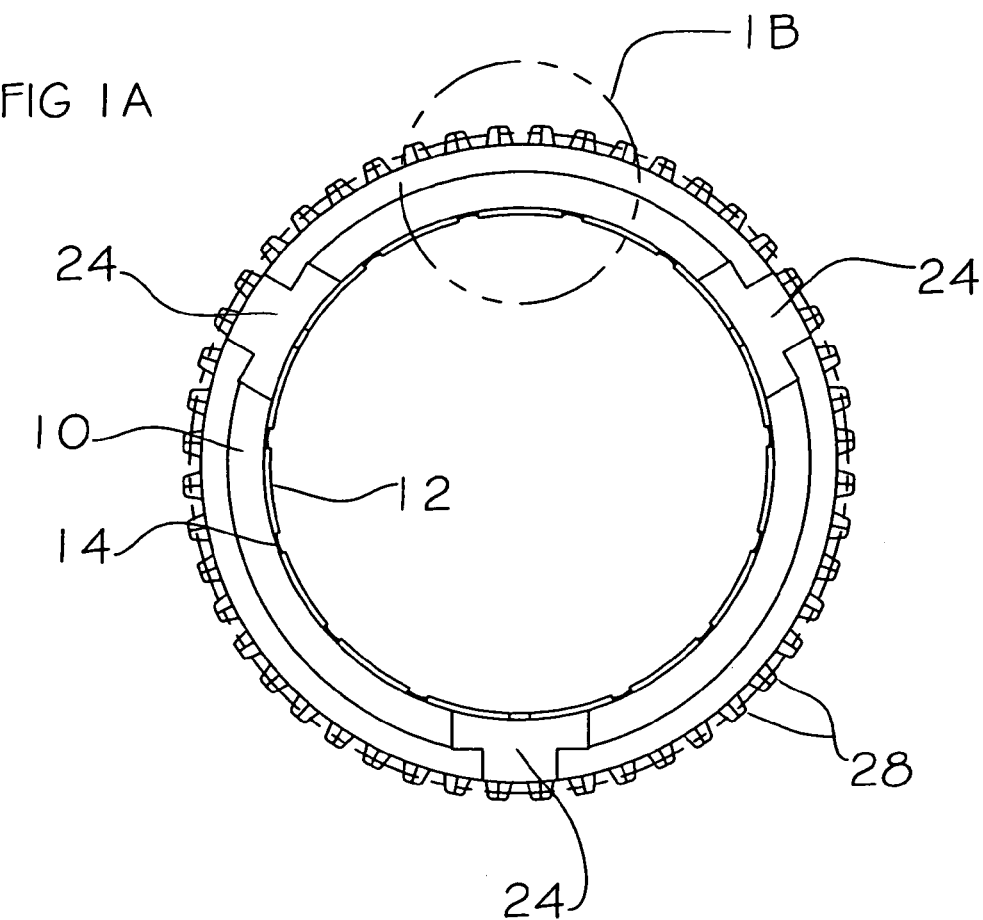
FIG. 1A is a view of a synchronizer ring having a facing material in accordance with one embodiment of the invention.
Figure 1B:
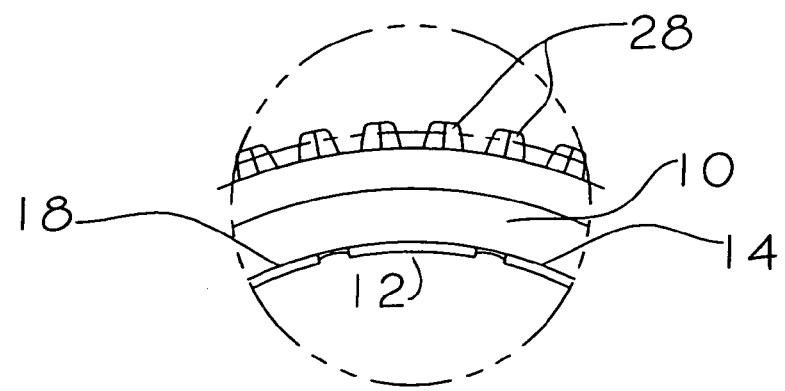
FIG. 1B is an enlarged view of the area 1B shown in FIG. 1A.

Referring now to the Figures in detail, identical numerals indicate either common elements or the same elements throughout the figures. FIGS. 1A–2 depict a synchronizer ring 10 for use in a transmission assembly (now shown). The synchronizer ring 10 comprises a friction facing material 12 affixed to an inner annular wall 14 (FIG. 1B) of the ring 10. It should be understood that the ring 10 is one element of a power transmission or absorption assembly (not shown), such as that utilized in clutches, brakes, automatic transmissions, limited slip differentials, hoists and other similar friction power transmission and energy absorption devices. One example of an environment in which the synchronizer ring 10 may be utilized is disclosed in U.S. Pat. No. 4,732,247 to Frost, which is hereby incorporated by reference and made a part hereof.

The blocker or synchronizer ring 10 and the friction facing material 12 discussed herein may be utilized with such friction power transmission and energy absorption devices, and it will be understood that friction facing material 12 of the present invention is not limited to such devices. For example, friction-facing material 12 may be utilized in other friction devices such as clutch plates, torque converter clutches, and transmission bands. Moreover, it is contemplated that the material of the present invention could be utilized in other devices where the control of fluid flow is required, such as gaskets, filters, nozzles and the like.

The friction facing material 12 may comprise a woven material such as the material shown and described in U.S. Pat. No. 5,615,758 and U.S. Pat. No. 6,065,579 or a composite, paper material or other material, such as is shown and described in U.S. Pat. Nos. 4,639,392; 4,700,823; 5,324,592; 5,662,993; 5,083,650; 5,585,166; and 5,989,390 all of which are incorporated herein by reference and made a part hereof. In one embodiment, the material comprises part CM-6500 friction material available from Euroflamm Select, the assignee of this application. In general, and as will be described later herein relative to FIGS. 18–22C, friction facing material 12 may be provided from a supply roll 16 (FIG. 18) and comprises an adhesive layer 18 which is formed or applied to on a first side 20 to provide a finished supply 22. As described in detail later herein, the friction facing material 12 is then stamped from the supply 22 and further processed and secured to the ring 10.

As best illustrated in FIG. 2, the blocker ring 10 comprises three raised lugs 24 equally spaced at 120-degree intervals around the blocker ring 10. The lugs 24 may be nested within associated hub notches of another member 26 (FIG. 2) of the assembly (not shown).

The blocker ring 10 also has a tooth or spline surface 28 (FIGS. 1A–2) formed on an outer surface or circumference thereof which is engageable with the power transmission-absorption assembly and thereby able to clock or rotate member 26 in accordance with a cooperating friction element 29 (FIG. 2) causing movement along inner annular wall 15. As best seen in FIGS. 1A–2, friction facing material 12 of the present invention is affixed to the inner wall 14 of annular wall 15 of blocker ring 10 by means of the layer of adhesive 18 (FIGS. 1B and 18), such a nitrile phenolic adhesive or other suitable adhesives as are conventionally known. It will be understood that cooperating friction element 29 (FIG. 2) is moveable along a longitudinal axis 30 in order to engage and disengage the blocker ring 10.

FIGS. 3A–17 are views of various embodiments of the invention. As illustrated in FIGS. 3A–3D, the friction facing material 12 of one embodiment comprises a first edge 12a, a second edge 12b, a top surface 12c, and a bottom surface 12d (FIG. 3B). The friction facing material 12 further comprises a plurality of through slots, grooves or channels 41 comprised of a combination of a plurality of spaced slots, grooves or first channels 32 (FIG. 3A) and a second plurality of spaced slots, grooves or second channels 40. Notice that each of the spaced first channels 32 each comprise a first area 34 associated with the first side 12a and a second area 36 associated with the second side 12b. For ease of illustration, one or more channels 32, 40 and 41 will be described, but it should be understood that these features apply to one or more of the other channels 32, 40 or 41 in the facing material 12.

As illustrated in FIG. 3A, notice that the spaced first channels 32 lie in radial planes, such as radial planes $P_1$ and $P_2$. As viewed in FIG. 3A, the first channels 32 are generally perpendicular to a circumference defined by edge 12a. As will be described in greater detail later herein, the friction facing material 12 also comprises a plurality of second grooves, slots or channels 40 that, with said first channels 32, permit a desired amount of lubrication and fluid to flow through or across the facing material 12 and between said first and second areas 34 and 36 and areas $A_2$ and $A_1$, respectively.

Each of the spaced channels 41 is dimensioned to have desired fluid flow characteristics. The first channel 32 is a deep channel or slot and has a length that extends a distance or dimension D1 (FIG. 3D) that is generally the width W1 (FIG. 3A) of the facing material 12. As illustrated in FIGS. 3B–3D, each of the plurality of first channels 32 is defined by a first wall 32a (FIG. 3C) and a second wall 32b which may be in an opposed or parallel relationship. Alternatively, the walls 32a and 32b may be angled, non-linear or curved such as those described and illustrated later herein. Thus, it should be appreciated that the walls 32a and 32b could be formed so that they are not parallel and so that, for example, a dimension D3 (FIG. 3C) of the first area 34 is larger than a dimension D6 (FIG. 3A) at the closed end 36 of the first channel 32. Selecting these dimensions D3 and D6 and the shape of walls 32a and 32b facilitates providing a desired amount of fluid flow into the first channel 32 and second channel 40.

Note that the facing material 12 has a connector portion 38 situated between walls 32a and 32b. A top surface 38a cooperates with walls 32a and 32b to define the second channel 40. The connector 38 is a length D5. In one embodiment, the channel 40 is formed by compressing the material 12 above the connector 38. Thus, the facing material 12 comprising the connector 38 is compacted or densified when the material 12 is embossed or pressed to provide the channel 38. Alternatively, the second channel 40 may be machined, laser cut or otherwise formed or provided in the facing material 12 to define the second channel 40 and connector 38.

In the embodiment described, the first channel 32 has a depth D2 (FIG. 3D) that generally corresponds to a thickness T1 (as viewed in FIG. 3C) of the friction facing material 12. Note that the connector 38 comprises a thickness T2 and a length D5 (FIG. 3D). In the embodiment being described, the area 43 above the connector 38 (as viewed in FIG. 3D) generally defines the second channel 40 and the area defined by the dimensions D2 and D5 in FIG. 3D generally define the first channel 32. As shown, the second channel 40 is in fluid communication with the first channel 32, as illustrated in FIGS. 3A–3D. As fluid enters the second area 36, it moves from a first area A1 (FIG. 3A) towards and through the second channel 40 and through the first channel 32 to a second area A2.

In one embodiment, the dimensions are illustrated in the following Table 1:

TABLE 1

| Dimension Shown in FIGS. 3A–3D | Value |
| --- | --- |
| D1 | .28 inch |
| D2 | .032 inch |
| D3 | .125 inch |
| D4 | .015 inch |
| D5 | .14 inch |
| L | 9.4 inches |
| T1 | .032 inch |
| T2 | .017 inch |
| W1 | .43 inch |

As can be seen from the illustration in FIG. 3C, each of the plurality of second channels 40 defines a shallow depth D4 (as viewed in FIG. 3C), which is defined by the height or thickness T2 of connector 38. In contrast, note that each of the plurality of first channels 32 is a deep channel that extends completely through the thickness T1 (FIG. 3C) of the friction facing material 12. A length or dimension D5 (FIG. 3D) of connector 38 also defines the size of channel 40. For example, a larger dimension D5 may result in a smaller channel 40 and vice versa.

In the embodiment illustrated in FIGS. 3A–3D, the plurality of spaced first channels 32 and plurality of second channels 40 are overlapped or in fluid communication, as illustrated in FIG. 3A, to provide the combined channel 41. However, as will be illustrated in several of the other embodiments shown in FIGS. 4A–18, the plurality of second channels 40 may be provided in any desired arrangement, such as in an arrangement where the second channel 40 is not provided in communication with each of the plurality of first channels 32. For example, FIGS. 4A–4D illustrate a staggered arrangement. FIG. 4A illustrates a plurality of first slots or channels 32, which are separate from the channels 41 comprising a combination of first channel 32 and second channel 40. The plurality of first channels 32 and those channels 41 comprising a second channel 40 in fluid communication with the first channel 32 may be arranged or provided in material 12 in any desired configuration. Thus, the material 12 shown in FIG. 4A, however, may comprise a combination of channels 32 and channels 41 having a plurality of first channels 32 that are in fluid communication with a plurality of second channels 40. Notice the staggered arrangement of the various channel 32 and channel 32/channel 40 combinations in FIG. 4A. In the illustration shown in FIG. 4B–4D, every other channel 32 comprises a combination of a deep first channel 32 alone or a first channel 32 in combination with a shallower second channel 40. It should be understood that the dimensions of the various components in the embodiment shown in FIGS. 4A–17 are similar to those described earlier relative to FIGS. 3A–3D. However, the first channels 32 shown in FIG. 4A–4D do not have a second channel 40 in fluid communication therewith and are, therefore, closed and do not permit fluid to flow therethrough. Consequently, they are closed to fluid flow at said second area 36.

In another embodiment, the first channel 32 and second channel 40 may comprise different widths as will now be described relative to FIGS. 5A–5D. As illustrated in FIG. 5A, the friction facing material 12 is shown comprising the plurality of first channels 32. Notice in FIGS. 5B–5D that the shallow or second channel 40 is defined by walls 40a and 40b and has a width CW1 (FIG. 5B) that is wider than a width CW2 (FIG. 5C) defined by walls 32a and 32b of the first channel 32.

As illustrated in FIGS. 3D, 4D and 5D, the connector 38 comprises a top surface 38a that shown is generally planar and parallel to the surface 12c in those embodiments. It should be understood, however, that the connector 38 may be defined by a shape that is other than planar and that has an orientation other than generally parallel to the surface 12c. For example, FIGS. 6A–6D illustrate another embodiment of the invention similar to the embodiment shown in FIGS. 5A–5D, except that the connector 38 comprises a surface 38a which is generally V-shaped in cross section and has a plurality of planar surfaces 38a1 and 38a2 as best illustrated in FIGS. 6B and 6C.

It should also be understood that each of the plurality of first channels 32 is defined by the walls 32a and 32b, while each of the plurality of second channels 40 may be defined by walls 40a and 40b. The walls 40a and 40b that define each of the plurality of channels 40 may be parallel as illustrated in FIGS. 3A–6D. Alternatively, they may be angled relative to the surface 12c, as illustrated by walls 40a1 and 40b1 in FIGS. 7A–7C, in order to facilitate fluid flow through the second channel 40 and any first channel 32 in fluid communication therewith. It is expected that the angled walls 40a1 and 40b1 facilitate separation between surface 12c and a mating friction surface (not shown) as the fluid flows, for example, upward (as viewed in FIG. 7C) along wall 40b1 toward a corner or ridge 37 and onto surface 12c as the facing 12 moves in the direction of arrow M in FIG. 7C.

FIG. 8A–8D illustrates still another embodiment wherein the surface 38a of connector 38 is generally U-shaped in cross section.

It should be appreciated that the surface 38a may be parallel to the surface 12c or 12d, such as in the embodiment shown in FIGS. 3A, 4A, 5A and 7A. However, it is not confined to this orientation, and it could be defined by a surface 38a that is not generally parallel to either the surface 12c or surface 12d. For example, FIGS. 9A–9D illustrates the friction facing material 12 comprising a connector 38 and connector surface 38a that lies in a plane that is angled relative to the surface 12c and surface 12d as shown. Thus, it should be understood that the configuration of the first channels 32 and second channels 40 and the various walls 32a, 32b, 40a and 40b that define those channels 32 and 40, as well as the shape, configuration and size thereof and of each connector 38 and surface 38a, each may be selected and configured as desired in order to provide the first channel 32 and second channel 40 or combined channel 41 with the desired dimensions and fluid flow characteristics. Angling the surface 38a of connector 38a predetermined angle θ, as illustrated in FIG. 6A–6D and 9A–9D, for example, facilitates increasing the fluid flow into and through the second channel 40 and first channel 32.

It should be understood that the friction facing material 12 may have connectors 38 situated, as illustrated in FIG. 3A. Alternatively, the connectors 38 may be situated, arranged or formed closer to the second side 12b. Moreover and as shown in the embodiment illustrated in FIG. 11, the connectors 38 may be provided adjacent to both sides 12a and 12b in a staggered or alternating configuration as shown.

Alternately, the connectors 38 could be provided between the first edge 12a and second edge 12b as shown in FIG. 13. As mentioned earlier herein, the second channels 40 may be provided in combination or fluid communication with one or more of the first channels 32. As illustrated in FIG. 12, the second channels 40 may be provided alone and/or in a staggering or alternate configuration or arrangement with a combination of channels 41 each comprised of a first channel 32 and second channel 40 that are in fluid communication. Again, the number of first channels 32 and second channels 40 and the number of channels 41 comprised of the first channel 32 in fluid communication with the second channel 40 may vary and will depend upon the application in which the friction facing material 12 is used. Although not shown, it is also contemplated that facing 12 could comprise a channel 32, a channel 40 and a combined channel 41.

It should be appreciated that the second channel 40 comprises a funnel-shaped opening 43 defined by walls 40a and 40b in FIG. 10A. Each opening 43 is shaped and configured to facilitate controlling funneling flow as desired. This facilitates causing a pumping action into channel 32. Alternatively, as illustrated in the various embodiments shown in FIGS. 14–16, walls 32c and 32b may be accurate to define a funnel shape of opening 37 that facilitates fluid flow into the channel 32 as the ring 10 rotates. It should be appreciated that if the first channels 32 comprise a funnel-shaped opening 37 as illustrated in FIG. 14, a sucking or vacuum action may occur which facilitates forcing fluid into and through both the second channel 40 and the first channel 32.

Note that material 12 comprises a plurality of friction areas or segments 62. As illustrated in FIGS. 3A, 4A, 11, 12 and 13, the friction material segments 62 may be either square or generally rectangular. Alternatively, they may comprise a scalloped or polygonal shape as illustrated in FIGS. 14, 15 and 16. In FIGS. 14 and 16, the friction material segments 62 may comprise an arcuate edge 62a associated with the second edge 12b of the friction facing material 12. The connectors 32 may be associated with the second edge 12b as illustrated in FIG. 10A. Alternatively, the arcuate or scalloped edge may be provided on the first edge 12a and the connector 38 may be provided closer to the first edge 12a, as illustrated in FIG. 16.

Still another embodiment of the invention is illustrated in FIG. 15 showing the channels 32 formed by walls 32e and 32f that are generally linear so as to define a friction facing material segment 62 which is generally polygonal. It is expected that shapes such as FIG. 17 will have maximum fluid flow in line with known effect of entry effect in fluid flow theory. It is expected that shapes such as FIG. 16 will be effective in retarding the formation of oil hydrodynamic oil films.

It should be understood, therefore, that the friction material segments 62 may be comprised of and define different shapes and sizes to facilitate increasing or decreasing fluid flow as the ring 10 rotates.

In the embodiments illustrated in FIGS. 1–16, the shallow second channels 40 were situated in a spaced relationship along a plurality of radial lines, such as lines $P_1$ and $P_2$ in FIG. 3A. If desired, however, it is also contemplated that each of the friction segments 62 could comprise one or more of the second channels 40 that are circumferentially oriented and extending partly or entirely through the material between ends 12e and 12f as shown in FIG. 17. This arrangement facilitates increasing fluid flow between and among a plurality of the first channels 32 with which the second channel 40 is in fluid communication.

Advantageously, the second channel 40 may be configured in various different arrangements relative to the first channels 32, such as when the first channel 32 is in fluid communication with the second channels 40 as illustrated or when they are not in fluid communication, yet are provided in the surface 12C as shown in the embodiment in FIG. 12. Also, the first channels 32 could be configured to have the walls 32a and 32b that are parallel, non-parallel, curved, arcuate or angled, as illustrated and described in embodiments shown in FIGS. 14–16. A general process or method for forming a synchronizing ring 10 having the friction facing material 12 mounted thereon will now be described relative to FIGS. 18 and 19.

Figure 18:
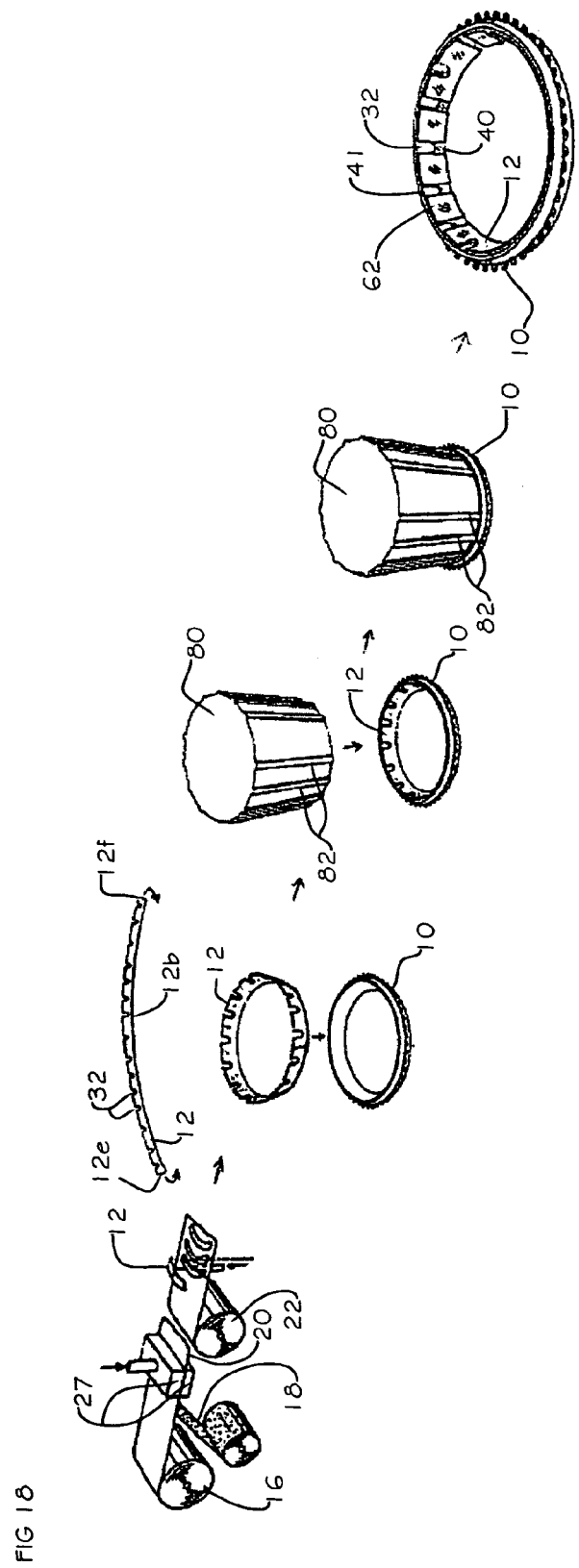
FIG. 18 illustrates a method for embossing or overlaying the second channels onto the first channels to provide a synchronizer ring having a bonded and grooved friction material mounted thereon in accordance with the invention described.

First, the supply 16 of friction facing material is provided and an adhesive film layer 18 is secured thereto (FIG. 18 and Block 70 in FIG. 19) to provide the friction facing material supply 22. At Block 72 in FIG. 19 and as illustrated in FIG. 18, the friction facing material 12 is stamped out of the supply 16 using a die 27. Notice that in the embodiment being described, the die 17 stamps each facing 12 with the plurality of first channels 32 therein.

At Block 74 (FIG. 19), the ends 12e and 12f are brought together as illustrated in FIG. 18 and then situated on the surface 14 (FIG. 1B) of ring 10.

Figure 19:
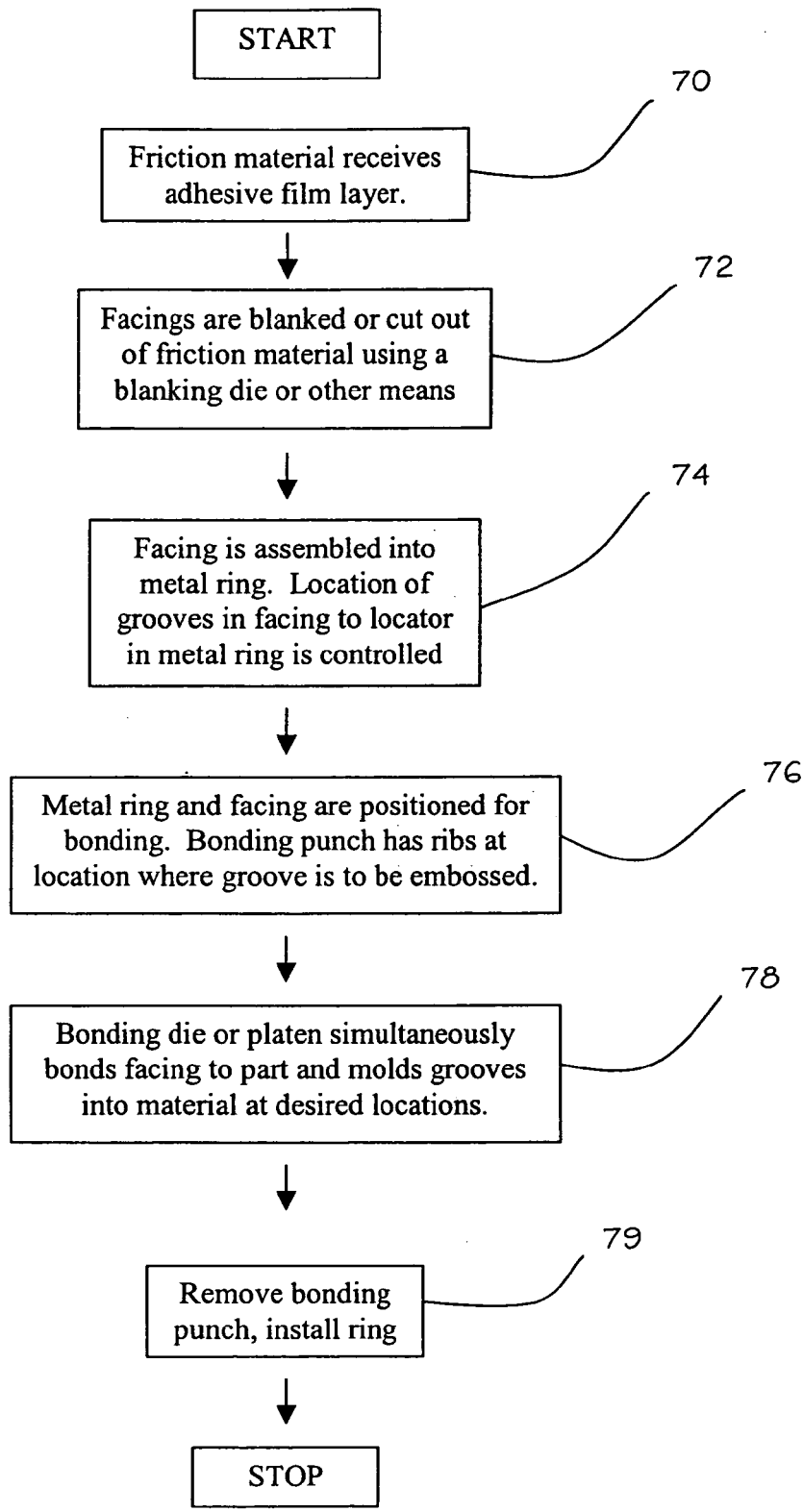
FIG. 19 is a schematic diagram of the method.

At Block 76 in FIG. 19 and as illustrated in FIG. 18, a heated bonding punch 80 is situated and aligned in operative relationship with the ring 10 such that one or more of the plurality of ribs 82 on the punch 80 forms or embosses the second channels 40 in the desired location on the facing material 12 when the punch 80 is actuated from the open position to the closed or bonding/embossing position as shown in FIG. 18. The punch 80 is heated so that in the embodiment being described it simultaneously forms the channels 40 in the desired location on the friction facing material 12d and causes the heat-activated adhesive on the surface 12 to bond to the surface 14. It should be appreciated, however, that some materials 12 may not require heat activation.

At Block 79 (FIG. 19), the bonding punch 80 is removed from the ring 10 and the ring 10 is subsequently installed into a friction environment, such as the environment described earlier herein relative to FIG. 2.

The ribs 82 are arranged on punch 80 so that the second channels 40 become aligned with and in fluid communication with some or all of the first channels 32 and have one or more of the other features or arrangements described earlier herein relative to FIGS. 3A–17.

Referring now to FIGS. 20A–21C, the process may comprise another feature which facilitates manufacturing a plurality of facings 12 with one or more pre-formed channels 47 that will define or provide the second channel 40. In the embodiment shown in FIGS. 20A–20C, for example, the facing 12 is stamped or die cut from the supply 22 having pre-formed grooves or channels 47. In the embodiment shown in FIGS. 21A–21C, notice that the supply 22 comprises the plurality of second channels 49 previously formed, machined, laser cut or embossed therein in a predetermined or desired pattern. As illustrated in FIGS. 20B and 21B, the facings 12 are then die cut or stamped from the supply 22. The stamped facing 12 comprises one or more the first channels 32 that are in fluid communication with the second channel 40 as described earlier herein. After processing, the resulting facing 12, illustrated in FIG. 21A, comprises both the first channels 32 and the second channels 49. In the illustration shown in FIG. 21A, the supply 22 may be provided such that several of the second channels 49 overlap and are in communication with the first channels 32 after the facing 12 is stamped from the supply 20.

In the embodiment shown in FIGS. 21A–21C another preformed or pregrooved supply material 22 is shown having a plurality of channels 49 provided in the material 16 in a non-linear, non-parallel or crisscross pattern as illustrated in FIG. 21C. As shown in FIG. 21B, the individual facings 12 are stamped from the supply material 22 to provide the finished facing 12 (FIG. 21A) with angled second channels 51. Notice that in this facing 12 only the second channels 40 are provided in the facing 12 and no first channels 32 are provided. Thus, it should be appreciated that the grooves or second channels 47 and 49 could be provided in any desired pattern selected and they could be pre-formed in the supply before the facing 12 is cut or stamped therefrom in order to achieve the fluid flow characteristics desired.

Advantageously, the embodiments shown and described in the other features of the invention which should now be apparent from the above description and appended claims, provide means, apparatus and method for facilitating fluid flow across a face or surface 12c of a facing material 12 by providing grooves or channels 32, 40, 41, 49 and 51 in a contemplated or predetermined pattern. Such pattern may include an overlapped combination of the first channel 32 with the second channel 40, as described earlier, so that fluid may flow through the channels 32 and 40.

In the embodiment described, the first channels 32 are stamped, and the second channels 40 are pressed or embossed as illustrated in FIG. 18. It should be understood, however, that the channels 40 could be machined, such as by milling, turning or grinding, or even lasered. Also, for ease of illustration, the first channel 32 and second channel 40 have been described as being provided in the facing 12 separately. However, it is contemplated that combined channel 41 may be provided or defined in the material 12 in a single operation, such as a single laser or machining step.

Although not shown, in another embodiment, the material 12 may be bonded to surface 14 of ring 10 and thereafter the channels 32 and/or 40 are cut, machined or lasered therein. Also, it is contemplated that the channels 40 could be cut to a depth that exceeds 100% of the thickness or depth D1 (FIG. 3A) of material 12, which means that the channels 40 would be partly formed or cut into the wall 14 of ring 10. Also, the widths CW1 (FIG. 5B) and CW2 may be the same, as shown in FIG. 3A. Alternatively, width CW2 can be wider (as shown in FIG. 5A) or narrower than CW1.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for forming a friction member comprising the steps of:
   providing a friction facing comprising a plurality of apertures having an open end and a closed end;
   situating said friction facing onto a support member; and
   creating a plurality of second channels into said friction facing in fluid communication with said plurality of apertures at a predetermined location at said closed end of said at least one of said plurality of apertures;
   wherein each of said plurality of second channels extending a first depth of said friction facing and said plurality of apertures extending a second depth of said friction facing, wherein said first and second depths are not equal.

2. The method as recited in claim 1 wherein at least one of said plurality of second channels is situated between a pair of said plurality of apertures.

3. The method as recited in claim 1 wherein said method further comprises the step of:
   creating said plurality of second channels at a predetermined location in said friction facing.

4. The method as recited in claim 3 wherein said predetermined location is between a first edge of said friction facing and a second edge of said friction facing such that said at least one of said plurality of second channels is in fluid communication with said plurality of apertures.

5. The method as recited in claim 3 wherein said creating step comprises the step of:
   driving a platen into said facing material to create said plurality of second channels.

6. The method as recited in claim 3 wherein said creating step comprises the step of:
   embossing said plurality of second channels into said friction facing.

7. The method as recited in claim 3 wherein said method further comprises: creating said plurality of second channels in said friction facing before said facing material is situated on said support member, said support member being a synchronizer.

8. The method as recited in claim 1 wherein said predetermined location is between a first edge of said friction facing and a second edge of said friction facing such that said at least one of said plurality of second channels is in fluid communication with said plurality of apertures.

9. The method as recited in claim 1 wherein said method further comprises the steps of:
   causing said friction facing to be aligned with a plurality of ribs on a platen;
   forcing said platen into said friction facing so that said plurality of ribs forms at least one of said plurality of second channels at said closed end of one of said plurality of apertures.

10. The method as recited in claim 9 wherein said forcing step further comprises the step of:
    forcing said platen into said friction facing so that one of said plurality of second channels is provided at each of said closed end of said plurality of apertures.

11. The method as recited in claim 10 wherein said forcing step further comprises the step of:
    forcing said platen into said friction facing so that one of said plurality of second channels is provided at some but not all of said closed ends of said plurality of apertures.

12. The method as recited in claim 1 wherein said method further comprises the step of:
    providing a facing having an adhesive on a bonding side thereof;
    heating said platen;
    driving said platen such that said plurality of second channels are formed while said facing material is being bonded to said support member.

13. The method as recited in claim 1 wherein said method further comprises: forming said plurality of second channels in said friction facing after said facing material is situated on said support member, said support member being a sychronizer.

14. The method as recited in claim 1 wherein said first thickness is less than 100 percent of the thickness of said friction facing and said second thickness is 100 percent the thickness of said friction facing.

15. A method for forming a friction member comprising the steps of:
    providing a friction facing comprising a plurality of apertures having an open end and a closed end;
    situating said friction facing onto a support member; and
    creating a plurality of second channels into said friction facing;
    providing a facing having an adhesive on a bonding side thereof;
    heating a platen;
    driving said platen such that said plurality of second channels are formed while said facing material is being bonded to said support member, wherein said support member is a synchronizer ring.

16. The method as recited in claim 15 wherein said support member is a clutch plate.

17. The method as recited in claim 15 wherein said support member is a synchronizer ring.

18. A method for forming a friction member comprising the steps of:
    providing a friction facing comprising a plurality of apertures having an open end and a closed end;
    situating said friction facing onto a support member; and
    creating a plurality of second channels into said friction facing;
    stamping said friction facing from a web having said plurality of second channels provided therein and prior to said situating step.

19. A method for forming a friction member comprising the steps of:

providing a friction facing comprising a plurality of apertures having an open end and a closed end;
situating said friction facing onto a support member; and
forming a plurality of second channels in said friction facing after said facing material is situated on said support member;
wherein said forming step comprises the step of:
embossing said plurality of second channels into said friction facing substantially simultaneously when facing material is being bonded onto said support member, wherein said support member is a synchronizer.

20. The method as recited in claim 19 wherein said support member is a clutch plate.

21. The method as recited in claim 19 wherein said support member is a synchronizer ring.

22. A method of increasing fluid flow across a facing material comprising the steps of:

providing a plurality of channels comprising a shallow area and a deep area for permitting fluid to flow from a first area, across a surface of said facing material, to a second area;

said shallow area and said deep area extending different depths through said facing material;

wherein said deep area extends 100 percent of the thickness of said facing material and said shallow area extends less than 100 percent of the thickness of said facing material.

* * * * *

UNITED STATES PATENT AND TRADEMARK OFFICE
CERTIFICATE OF CORRECTION

| | | |
|---|---|---|
| PATENT NO. | : 7,069,636 B2 | Page 1 of 1 |
| APPLICATION NO. | : 10/677577 | |
| DATED | : July 4, 2006 | |
| INVENTOR(S) | : Douglas B. Guthrie et al. | |

It is certified that error appears in the above-identified patent and that said Letters Patent is hereby corrected as shown below:

On the Title Page in (56) References Cited, in Patent No. 3,250,349 please delete "Bymes et al." and insert --Byrnes et al.-- therefor.

On the Title Page in (56) References Cited, page 2, please delete "5,897,797 A 4/1999 Drouillard et al." and insert --5,897,737 A 4/1999 Quigley-- therefor.

In Column 3, Line 19, please delete "A" and insert --a-- therefor.

In Column 4, Line 48, after "synchronizer" please insert --or blocker--.

In Column 5, Line 13, please delete "Euroflamm Select" and insert --Sulzer Euroflamm US Inc.-- therefor.

In Column 6, Line 27, please delete "38" and insert --32-- therefor.

In Column 9, Line 48, please delete "synchronizing" and insert --synchronizer-- therefor.

In Column 10, Line 4, please delete "friction facing material" and insert --bottom surface-- therefor.

In Column 10, Line 6, please delete the first word "surface" and insert --friction facing material-- therefor.

In Column 12, Line 24, please delete "said" and insert --a-- therefor.

In Column 12, Line 34, please delete the first word "thickness" and insert --depth-- therefor.

In Column 12, Line 35, please delete "thickness" and insert --depth-- therefor.

In Column 12, Line 32, please delete "sychronizer" and insert --synchronizer-- therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,069,636 B2 | Page 1 of 1 |
| APPLICATION NO. | : 10/677577 | |
| DATED | : July 4, 2006 | |
| INVENTOR(S) | : Douglas B. Guthrie et al. | |

It is certified that error appears in the above-identified patent and that said Letters Patent is hereby corrected as shown below:

On the Title Page in (73) please delete "Euroflamm Select Inc." and insert --Sulzer Euroflamm US Inc.-- therefor.

Signed and Sealed this
Eleventh Day of November, 2014

Michelle K. Lee
*Deputy Director of the United States Patent and Trademark Office*